US012792918B2

(12) United States Patent
Biswas et al.

(10) Patent No.: US 12,792,918 B2
(45) Date of Patent: Nov. 10, 2026

(54) METHOD AND SYSTEM FOR DYNAMIC LARGE MODEL COMPRESSION

(71) Applicant: Verizon Patent and Licensing Inc., Basking Ridge, NJ (US)

(72) Inventors: Subham Biswas, Thane (IN); Saurabh Tahiliani, Noida (IN)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 586 days.

(21) Appl. No.: 18/352,437

(22) Filed: Jul. 14, 2023

(65) Prior Publication Data

US 2025/0021818 A1 Jan. 16, 2025

(51) Int. Cl.

| | |
|---|---|
| ***G06N 3/082*** | (2023.01) |
| ***G06F 17/16*** | (2006.01) |
| ***G06F 18/22*** | (2023.01) |
| ***G06N 3/045*** | (2023.01) |
| ***G06N 3/049*** | (2023.01) |
| ***G06N 3/0495*** | (2023.01) |
| ***G06N 3/08*** | (2023.01) |
| ***G06N 3/084*** | (2023.01) |
| ***G06N 20/00*** | (2019.01) |

(52) U.S. Cl.

CPC ........... *G06N 3/082* (2013.01); *G06N 3/0495* (2023.01); *G06F 17/16* (2013.01); *G06F 18/22* (2023.01); *G06N 3/045* (2023.01); *G06N 3/049* (2013.01); *G06N 3/08* (2013.01); *G06N 3/084* (2013.01); *G06N 20/00* (2019.01)

(58) Field of Classification Search

CPC ...... G06N 3/082; G06N 3/0495; G06N 3/045; G06N 20/00; G06N 3/08; G06N 3/084; G06N 3/049; G06F 18/22; G06F 17/16

See application file for complete search history.

(56) References Cited

U.S. PATENT DOCUMENTS

2018/0247193 A1* 8/2018 Holtham ................ G06N 20/00

OTHER PUBLICATIONS

Cheng et al., NPL ("Model Compression and Acceleration for Deep Neural Networks" Published 2018 by IEEE, 11 pages (Year: 2018).*

* cited by examiner

*Primary Examiner* — Quoc A Tran

(57) ABSTRACT

The present teaching relates to compressing a model for an application to generate a compressed model. The model has multiple layers, each of which has multiple nodes. Operating the model utilizing an application-dependent dataset, redundant nodes/layers in the model are identified via a loss-based assessment. The loss-based assessment using aggregated output vectors computed based on output vectors produced by the nodes/layers of the model in response to the data samples of the application-dependent dataset. Removing the redundant nodes/layers yields the compressed model.

20 Claims, 11 Drawing Sheets

100

120

| | Node 1 | Node 2 | | Node i | | Node 1-1 | Node 1 |
|---|---|---|---|---|---|---|---|
| Node 1 | 1.0 | 0.96 | --------- | 0.24 | --------- | 0.33 | 0.46 |
| Node 2 | 0.96 | 1.0 | --------- | 087 | --------- | | |
| | ⋮ | ⋮ | ⋮ | ⋮ | ⋮ | ⋮ | ⋮ |
| Node i | 0.24 | 0.87 | --------- | 1.0 | --------- | | |
| | ⋮ | ⋮ | ⋮ | ⋮ | ⋮ | ⋮ | ⋮ |
| Node l-1 | 0.34 | | | | | 1.0 | |
| Node l | 0.45 | | | | | | 1.0 |

Fig. 4

METHOD AND SYSTEM FOR DYNAMIC LARGE MODEL COMPRESSION

BACKGROUND

Machine learning models are used for various purposes including decision making, predicting trends and generating language and images. The models are generally trained initially on training data and then can perform such predictive and generative actions. During the training process, the models acquire the knowledge implicitly represented by the training data and may then be applied to make decisions in the future based on the acquired knowledge. Complex language models that are becoming common today are comprehensive models, constructed, e.g., via an artificial neural network, and may include millions of nodes across many layers. Both training and maintaining such a comprehensive model can be expensive in terms of time, space, computing resources, capital, etc. Although a comprehensive model may be used to handle a subset of the tasks that it is trained for, it may not be justified considering the cost.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 4 shows an exemplary similarity matrix for nodes present in a model being compressed, in accordance with an embodiment of the present teaching;

DETAILED DESCRIPTION OF EXAMPLE EMBODIMENTS

In the following detailed description, numerous specific details are set forth by way of examples in order to facilitate a thorough understanding of the relevant teachings. However, it should be apparent to those skilled in the art that the present teachings may be practiced without such details. In other instances, well known methods, procedures, components, and/or system have been described at a relatively high-level, without detail, in order to avoid unnecessarily obscuring aspects of the present teachings.

The present teaching is directed to a framework of compressing a previously trained original model for a particular application based on an application-dependent dataset. The original model may be previously constructed to accomplish comprehensive tasks (e.g. a large language model) and may be utilized in different applications. A trained model can be complex in order to capture comprehensive knowledge. For instance, an artificial neural network (ANN) model may comprise millions of nodes in multiple layers with many connections with weights and biases. A particular application may utilize a comprehensive model to handle a subset of the comprehensive tasks that the comprehensive model is trained for, however it will likely be excessive. In addition, excessive computing resources are required in order to execute the complex model to carry out a subset of tasks, therefore wasting the valuable resources. Furthermore, because of the complexity in computation, these models tend to take a significant amount of time to operate, more than available. In some situations, using a complex model may even overly complicate the problem solution. For example, a language model for, e.g., language understanding and generation, may be previously trained to capture comprehensive knowledge during learning in this domain. Although such a trained comprehensive model may be utilized in a particular application for, e.g., generating an interactive voice response (IVR) with a limited vocabulary, it may be an overkill and running the overall model for generating an IVR response with limited vocabulary may result in delay of voice prompts and responses to users.

Figure 1:
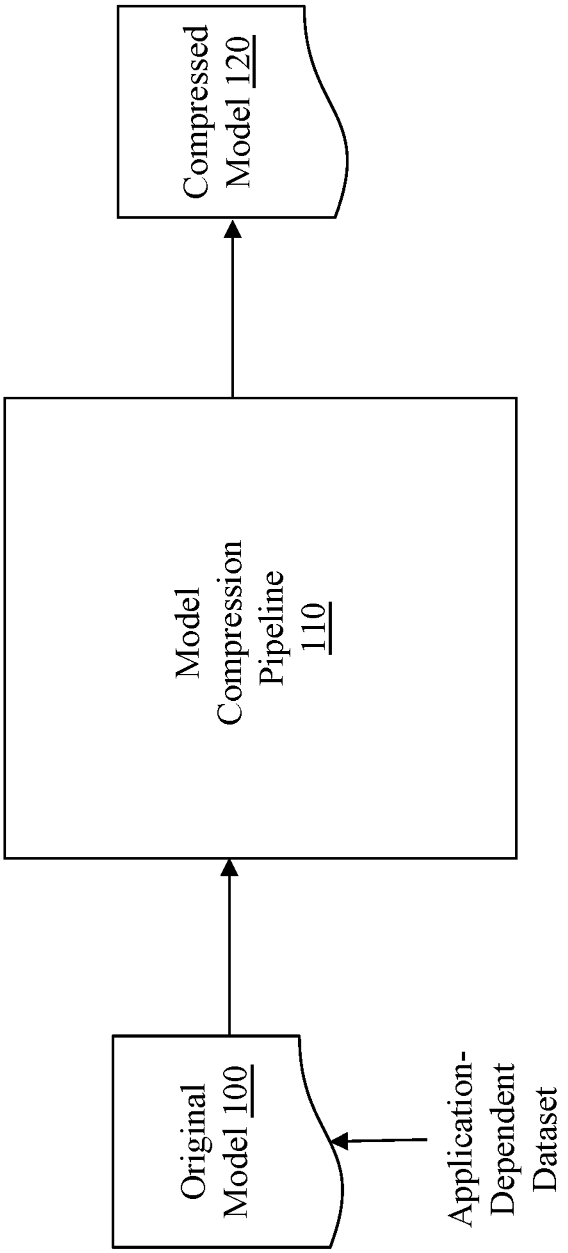
FIG. 1 depicts a model compression framework, in accordance with an embodiment of the present teaching.
Figure 2A:
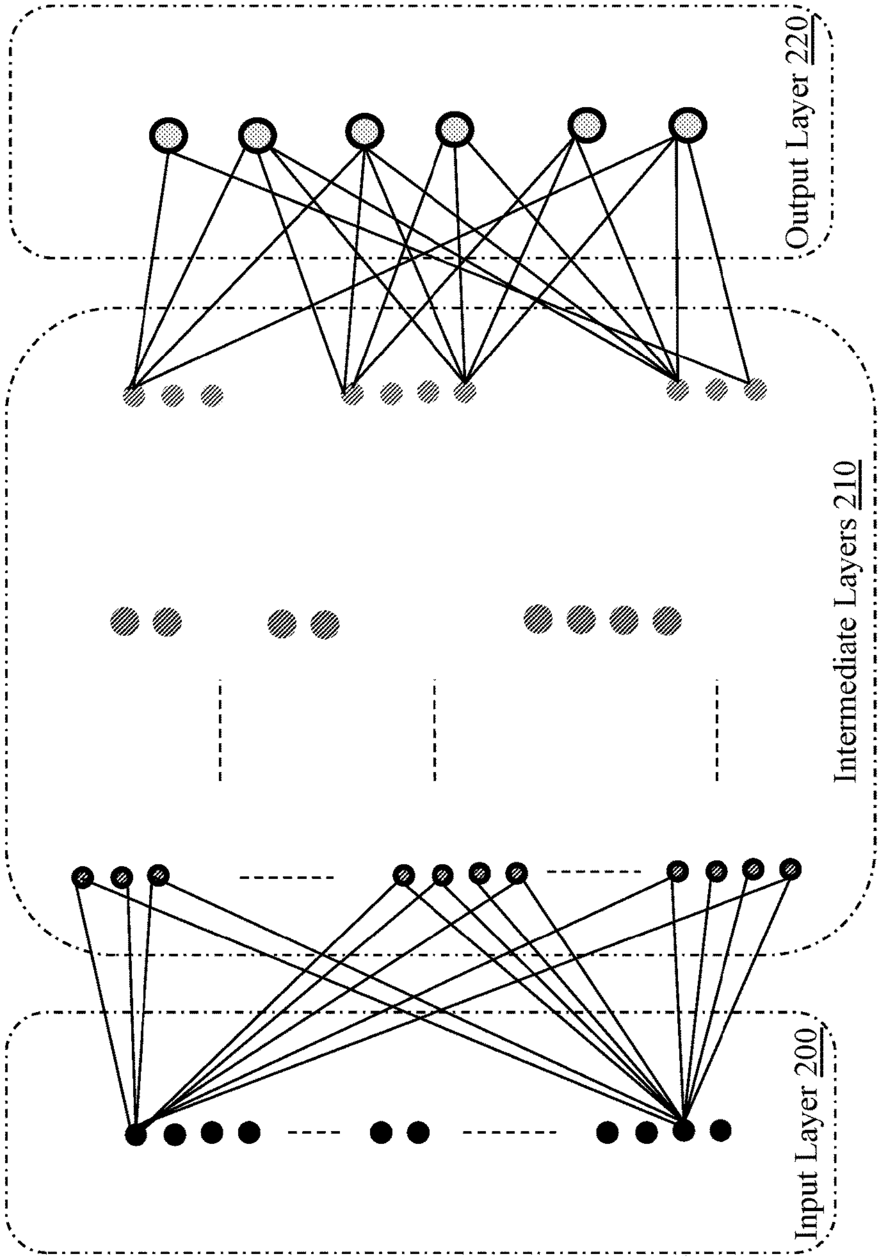
FIG. 2A depicts an exemplary construct of an artificial neural network (ANN) with multiple layers, each of which includes a plurality of nodes simulating corresponding neurons.

The present teaching is directed to a framework to compress a previously trained model (e.g., a more comprehensive model with a larger set of nodes and layers, and the like) to reduce the complexity, the resources required for execution, the execution time and the storage space for the model, etc. This is shown in FIG. 1, where a model compression pipeline 110 compresses an original model 100 to produce a compressed model 120 based on an application-dependent dataset. In the situation where the original model 100 corresponds to an ANN, the compression may be achieved by removing nodes/layers in the original model that are functionally non-contributing to solving problems associated with the new application. This is illustrated in FIGS. 2A-2D. FIG. 2A illustrates an ANN original model 100 with different layers, including an input layer 200, an output layer 220, and one or more intermediate layers 210. As seen, each of the layers includes a plurality of nodes. In this exemplary ANN original model 100, each node at a layer may be fully connected to all nodes at a next layer and each of such connections may be weighed by a weight learned during training.

Figure 2B:
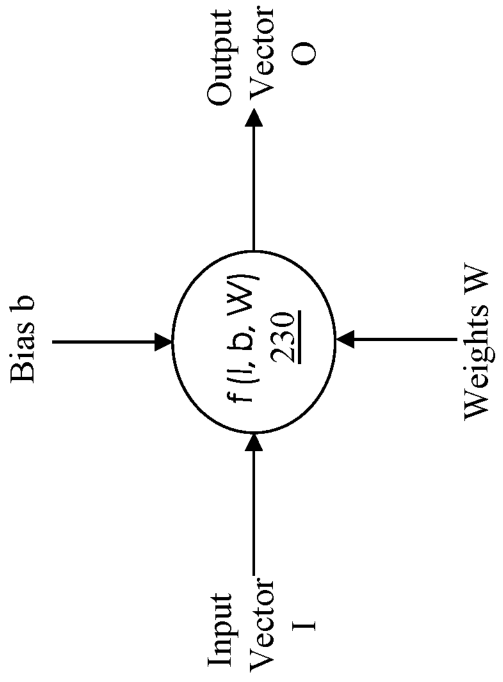
FIG. 2B shows an exemplary node in an ANN and its function with respect to different inputs.
Figure 2C:
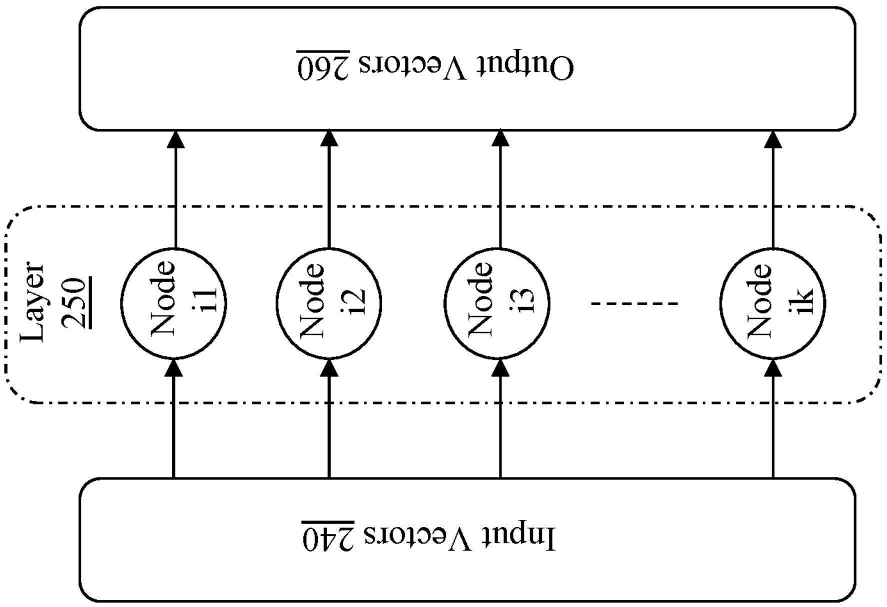
FIG. 2C shows an exemplary layer of an ANN with a plurality of nodes therein.
Figure 2D:
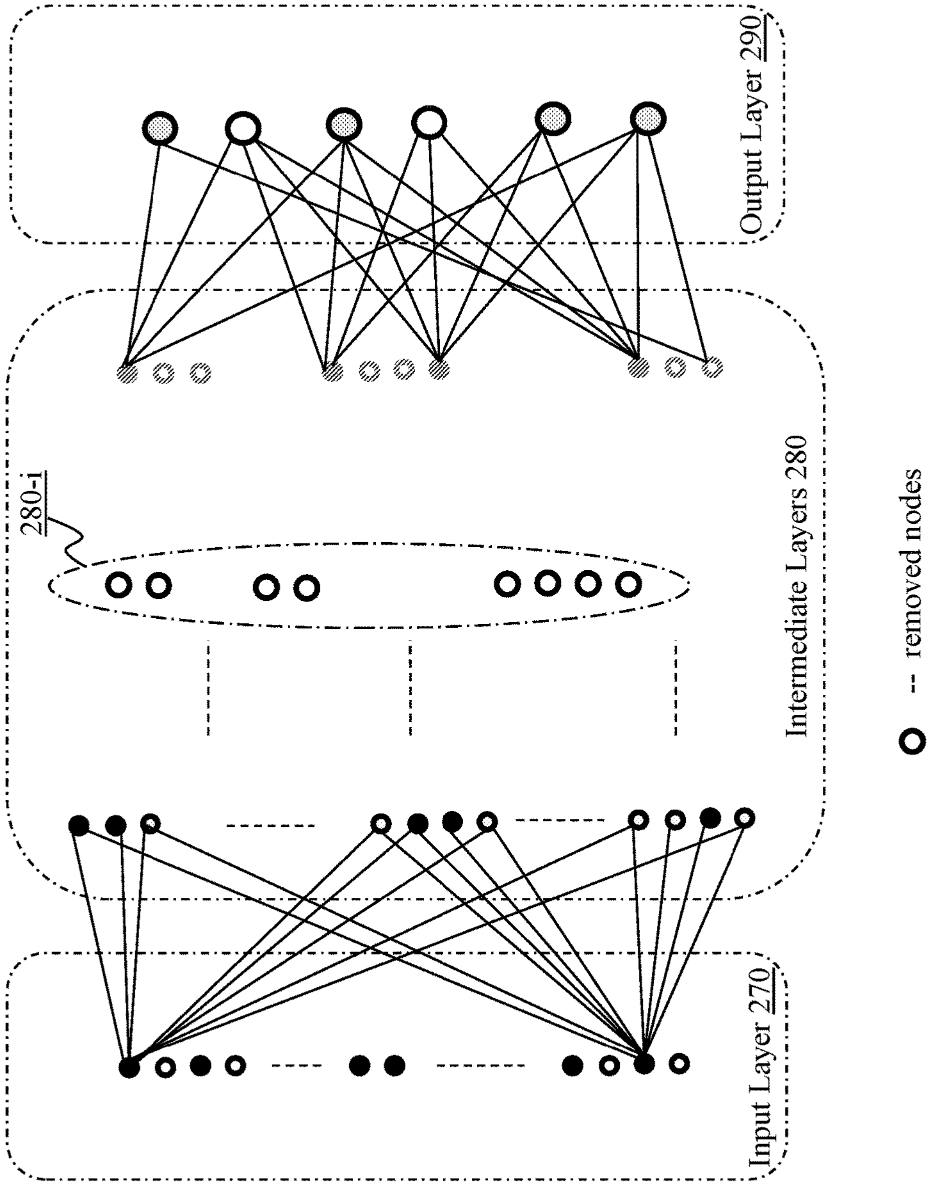
FIG. 2D illustrates an exemplary compressed model with certain nodes and layer(s) removed with the reduction determined based on application-dependent data set, in accordance with an embodiment of the present teaching.

FIGS. 2B-2D illustrates the model compression according to the present teaching. FIG. 2B shows an exemplary construct of a node in an ANN model and its trainable parameters associated therewith. As seen, a node performs a function 230 denoted as, e.g., f, which takes inputs, including an input vector I, a bias b, and a weight W, and produces an output vector O=f (I, b, W) in accordance with the designated function f, where b and W correspond to learnable parameters. FIG. 2C illustrates a layer 250 in an ANN model with multiple nodes, where these nodes take input vectors 240 from a previous layer as input and generate output vectors 260 to be fed to the next layer. In some embodiments, to compress the original model 100 with respect to a particular application, the functions performed by each node and each layer may be compared and those nodes/layers that have vector representations sufficiently similar to that of others so that they may be considered as functionally non-contributing or redundant and thus may be removed. There may be different situations in which nodes/layers may be considered redundant. For example, redundant nodes/layers may perform functions that are also performed by other nodes/layers and thus, they are not functionally contributing. In a different situation, some nodes/layers may be trained to capture some knowledge or capability that are not relevant to the tasks at hand. Such nodes/layers are also functionally non-contributing to the application at issue and, thus, are redundant.

FIG. 2D illustrates an exemplary compressed model 120 with compressed input layer 270, compressed intermediate layers 280, and a compressed output layer 290 with some nodes (marked as hollow) and some layers (e.g., layer 280-*i*) in the original model 100 removed. According to the present teaching, the non-contributing nodes/layers are identified based on performance of the original model on the application-dependent dataset. In some embodiments, the performance of the original model is evaluated in accordance with a loss-based evaluation scheme. With the application-dependent and functionality-based compression scheme, the original model 100 may be fully leveraged with respect to the particular application yet with optimized (minimized) number of layers/nodes that are deemed useful, i.e., functionally contributing, to the application in hand. Details related to how to determine functionally non-contributing nodes/layers are provided with reference to FIGS. 3-5B.

Figure 3A:
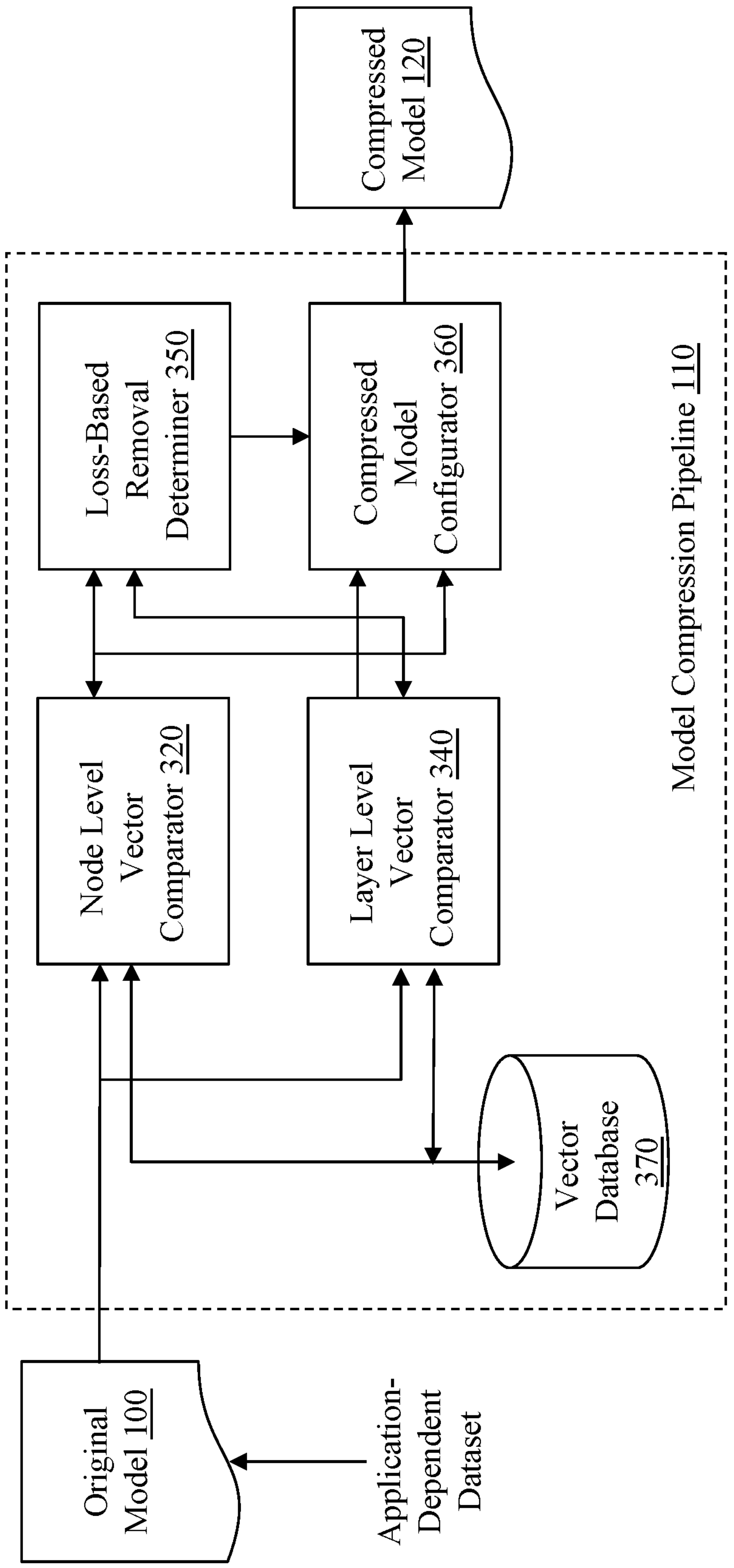
FIG. 3A depicts an exemplary high level system diagram of a model compression pipeline, in accordance with an embodiment of the present teaching.

FIG. 3A depicts an exemplary high level system diagram of the model compression pipeline 110, in accordance with an embodiment of the present teaching. As discussed herein, the original model 100 is compressed by evaluating whether each of the nodes and layers in the original model is functionally contributing with respect to an application-dependent dataset, which may be collected to capture the essence of the application. To achieve compression, the application-dependent dataset is provided to the original model 100 as input to train the original model 100 so that parameters of different nodes/layers of the original model 100 are adjusted to the application in hand.

With the trained original model 100, data samples of the application-dependent dataset are fed to the original model 100 as input, one at a time, so that the nodes/layers in the model operate to respond to the input data sample and generate corresponding output vectors. Such output vectors from nodes/layers may then be used to assess, with respect to each of the nodes/layers in the original model, whether any of the nodes/layer has vector representation similar to that of others to detect non-contributing nodes/layers as candidates for removal. That is, if node A and node B perform the same function, one of them may be redundant and may potentially be removed. Each of the identified removal candidates (either a node or a layer) may then be evaluated on its impact on the overall performance of the entire model (e.g., based on the loss) to ensure that removal of a node/layer does not impact the overall performance of the entire model, beyond a preconfigured threshold. Such a threshold may be configured based on, e.g., specific application needs. In some embodiments, the threshold may be system generated dynamically based on some condition such as the least drop in performance or largest drop in model size and complexity (if any). Those removal candidates that do not impact the overall performance of the entire mode (according to some specified criterion) may then be removed from the original model 100 to generate the compressed model 120.

The output vectors from nodes/layers of the original model 100 according to each data sample of the application-dependent dataset are provided to the model compression pipeline 110 for the removal operation. In some embodiments, the removal candidate determination may be carried out based on aggregated vectors from nodes/layers. That is, output vectors of a node/layer produced in response to different data samples may be aggregated via different means. For example, in some embodiments, such output vectors from the same node/layer may be averaged to generate an aggregated output vector. The aggregated output vector associated with each node/layer may be used for removal evaluation. As discussed herein, the removal consideration may be based on an assessment on whether the functional roles between nodes/layers are equivalent and the assessment may be based on the aggregated output vectors associated with such nodes/layers. For example, if these two nodes/layers are functionally similar, their aggregated output vectors may reach a certain level of similarity, i.e., one of the two nodes/layers may be functionally non-contributing (redundant) and may be selected as a removal candidate. In some embodiments, the removal evaluation with respect to nodes and that with respect to layers may be performed separately.

Figure 3B:
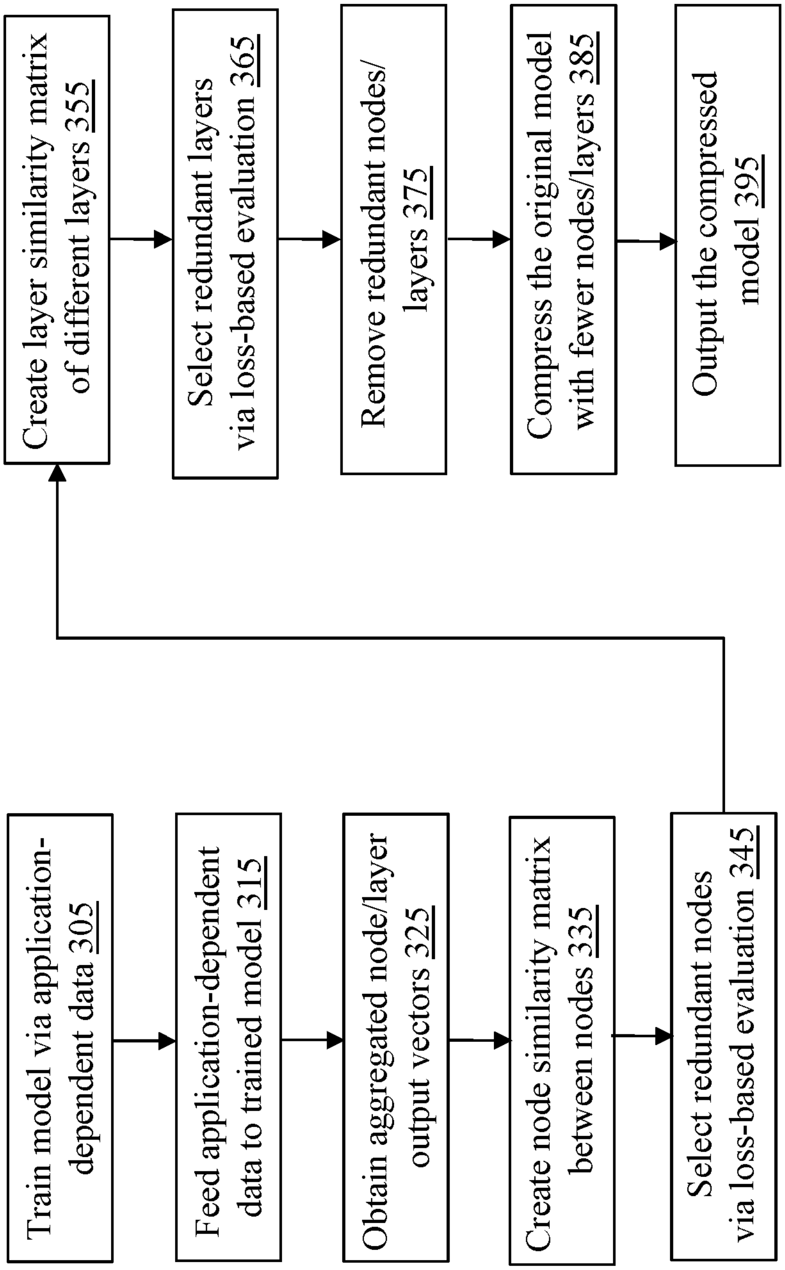
FIG. 3B is a flowchart of an exemplary process of a model compression pipeline, in accordance with an embodiment of the present teaching.

In this illustrated embodiment, the model compression pipeline 110 comprises an output vector aggregator 300, a node level vector comparator 310, a layer level vector comparator 320, a loss-based removal candidate determiner 330, and a compressed model configurator 340. FIG. 3B is a flowchart of an exemplary process of the model compression pipeline 110, in accordance with an embodiment of the present teaching. In operation, the application-dependent dataset is first used at 305 to train the original model 100. That is, the learnable parameters of the trained original model 100 are now adjusted according to the application-dependent data. As discussed herein, in some embodiments, to compress the original model, aggregated output vectors may be generated. This may be achieved by feeding the data samples of the application-dependent data into the original model, at 315, and then the aggregated vector aggregator 300 uses the output vectors for each node/layer for different data samples to obtain, at 325, an aggregated output vector for the node/layer for further operation.

In some embodiments, the aggregated output vectors for each node/layer may be obtained in an iterative manner. To support the iterative operation, a vector database 370 may be provided. For example, when the first data sample is input to the original model 100, the node/layer produces an output vector, which is stored in the vector database 370. When the second data sample is input to the original model 100, the output vector aggregator 300 may retrieve the output vector for the previous data sample from the vector database 370 and aggregate it with the output vector from the node/layer for the second data sample to generate an aggregated output vector for the node/layer, which is then stored in the vector database 370. This iterative process continues until all the data samples have been provided to the original model so that the last stored aggregated output vector for the node may be used for further processing.

Based on the aggregated output vectors for all nodes/layers of the original model, the node level vector comparator 310 may then be invoked to create, at 335, a similarity matrix for all nodes in the original model. FIG. 4 shows an exemplary similarity matrix for nodes present in a model being compressed, in accordance with an embodiment of the present teaching. In this exemplary similarity matrix, rows and columns may represent the nodes in the model and the recorded metric in each cell of the matrix corresponding to, e.g., node A and node B, may represent a level of functional similarity measured between the two nodes. For instance, in this exemplary similarity matrix, the similarity between node 1 and node 2 is 0.96 and that between node 1 and node i is 0.24, etc. Each similarity metric may be measured based on the aggregated output vectors of the two nodes. In some embodiments, the similarity metric may be computed by taking an inner product of the two aggregated output vectors. Any other means may also be employed to measure the similarity of two vectors.

In some embodiments, the similarity matrix may encompass all nodes in the original model, some may be at the same layer, and some may be from different layers. In some embodiments, the original model may include multiple connected sub-ANN networks, each of which may have its own input, output, and intermediate layers. Some of such sub-networks may be of different types, such as a multilayer perceptron neural network, a feedforward neural network, a long-short term memory (LSTM) neural network, a convolutional neural network (CNN), a recurrent neural network (RNN), etc. With an original model having different types of connected sub-neural networks, the similarity matrix for nodes may include, either all nodes from the sub-networks or some nodes from some of the sub-networks. The choice of which nodes are included in the similarity assessment may be determined based on, e.g., application needs or any practical considerations arising from the applications in hand.

Although a similarity matrix as illustrated in FIG. 4 is disclosed herein as an operational mode where similarity metrics are computed and stored in similarity matrices, it is merely described as an illustration and is not intended as a limitation. Other operational mode to utilize similarity metrics in selecting removal candidates (either nodes or layers) may also be used. For instance, in some embodiments, each similarity metric between two nodes/layers may be computed and utilized, on-the-fly (in a streamline operation without storing in a matrix), for selecting a removal candidate. In this on-the-fly operational mode, a removal candidate (either a node or a layer), once selected based on the computed similarity metric, may be evaluated as a next step based on a loss determined in a simulation to facilitate a decision as to whether the selected removal candidate is indeed redundant.

With the computed similarity matrix for nodes in the original model, the loss-based removal candidate determiner 330 may be invoked to select, at 345, nodes that are considered as redundant via a loss-based evaluation. As discussed herein, this evaluation process may first select removal candidates based on similarity measures from the similarity matrix and each of such candidates may be assessed based on the impact on the overall performance of the model. Details related to the operation of the loss-based removal candidate determiner 330 will be provided below with reference to FIGS. 5A-5B. When the redundant nodes are determined, the layer level vector comparator 320 may be invoked to create, at 355, a similarity matrix for layers in the original model. A similarity matrix for layers may be similarly constructed for all layers present in the original model. Each similarity measure indicates a level of equivalence of the functional roles played by two different layers. The similarity matrix for layers may then be used by the loss-based removal candidate determiner 330 to select, at 365, redundant layers for removal based on loss-based evaluation. With the removal nodes/layers determined by the loss-based removal candidate determiner 330, the compressed model configurator 340 proceeds to remove, at 375, the redundant nodes/layers accordingly and compress, at 385, the original model 100 to generate the compressed mode 120 with fewer nodes/layers. The compressed model 120 is then output at 395 so that it can be applied to the application.

Figure 5A:
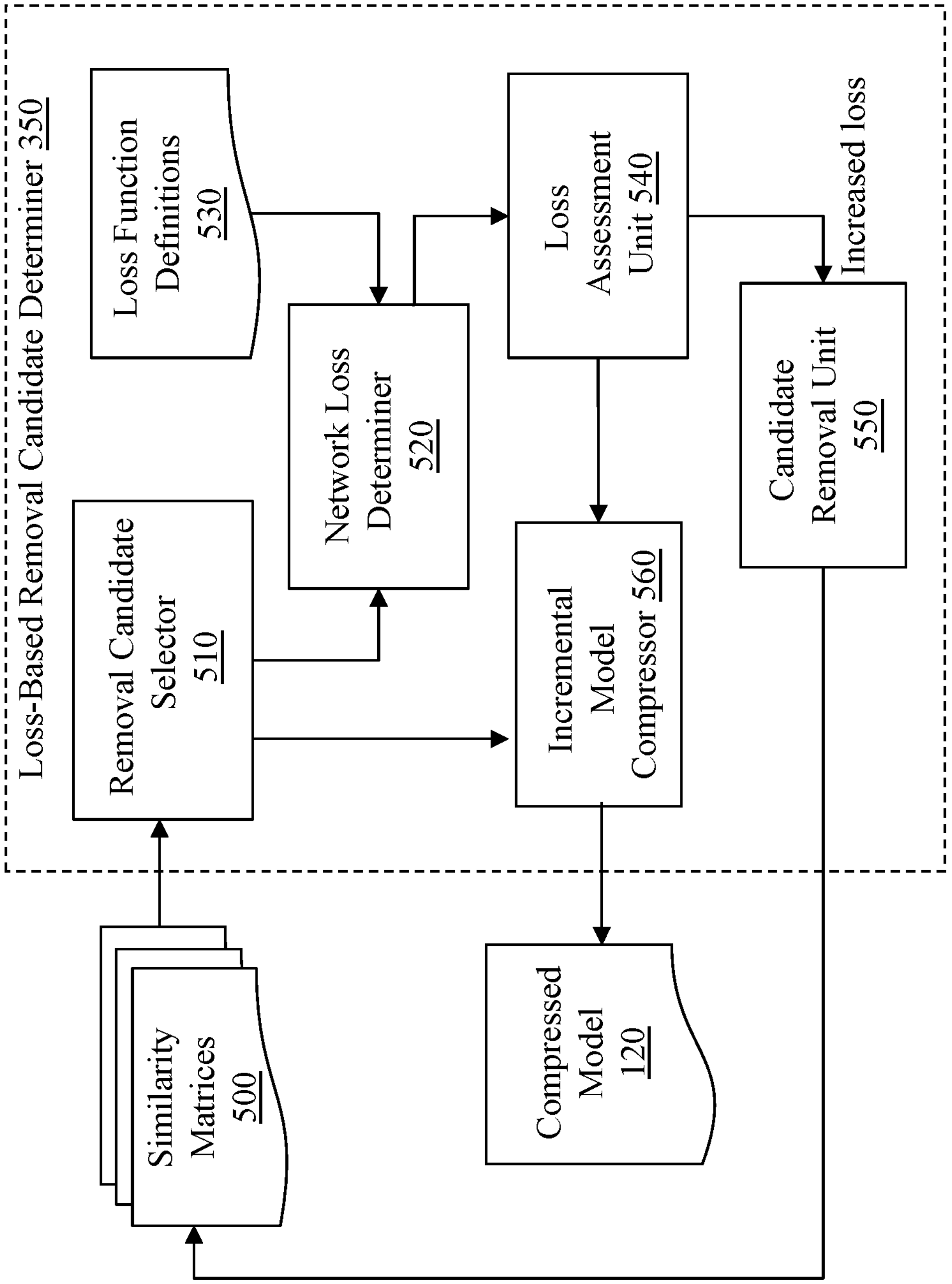
FIG. 5A depicts an exemplary high level system diagram of a loss-based removal candidate determiner, in accordance with an embodiment of the present teaching.

FIG. 5A depicts an exemplary high level system diagram of the loss-based removal candidate determiner 330, in accordance with an embodiment of the present teaching. As discussed herein, the loss-based removal candidate determiner 330 is provided for determining which nodes/layers are redundant (i.e., functionally non-contributing) based on similarity matrices. As such, the loss-based removal candidate determiner 330 takes similarity matrices 500 (for nodes and layers, respectively) 500 as input and outputs information specifying the nodes/layers to be removed to the compressed model configurator 340 (see FIG. 3A), which then accordingly removes such redundant nodes/layers from the original model 100 to produce the compressed model 120. In this illustrated embodiment, the loss-based removal candidate determiner 330 comprises a removal candidate selector 510, a network loss determiner 520, a loss assessment unit 540, and a candidate removal unit 560. In some embodiments, the loss-based removal candidate determiner 330 may operate to determine nodes to be removed prior to determining layers to be removed. In operation, the removal decisions may be made one at a time.

The removal candidate selector 510 may be provided for selecting node/layer removal candidates based on similarity measures in a similarity matrix (either for nodes or for layers). The removal candidates may be those that perform a function sufficiently similar to another node/layer and, thus, potentially redundant. In some embodiments, the sufficiency may be defined that the similarity measure between two aggregated output vectors from two nodes or two layers is above a specified level. For instance, a similarity above 0.9 may be defined to be sufficiently similar. In this case, node 2 in FIG. 4 may be deemed as performing a similar function as node 1. Whether a selected removal candidate is truly redundant may also depend on whether its removal leads to a negative impact on the performance of the model, which may be detected based on, e.g., an increase in the loss of the model.

The network loss determiner 520 is provided to simulate a removal of each removal candidate (a node or a layer) and then determine a loss of the model after the simulated removal. The loss assessment unit 540 is provided for comparing the losses of the model prior to and after the simulated removal. If there is no increase in loss after the simulated removal, it indicates that not only the removal candidate performs a redundant function but also its removal does not cause any negative impact on the performance of the model. That is, the candidate is functionally non-contributing. In this case, the removal candidate can be removed (or compressed) from the model. The loss assessment unit 540 may send information to the model configurator 340 for affirming that the removal candidate can be removed to compress the model.

If the loss of the model increases due to a simulated removal, this may indicate that although the candidate performs a similar function as another node/layer, it implicitly plays some other functionally contributing roles in the model so that the candidate is not redundant and, hence, should not be removed. In this case, the removal of the candidate is not affirmed because it does not pass the loss-based assessment. In some embodiments, such loss-based redundancy assessment may be carried out with respect to a pre-determined loss-based redundancy condition 550, which may be defined as a certain percent of the total loss. For example, the loss-based redundancy condition 550 may be specified as 10% of the total loss, i.e., so long as the increased loss is within 10% of the loss without a simulated removal, the removal candidate may still be removed. Such a condition may be set up based on, e.g., a compression rate desired. If a higher compression rate is desired, the percent may increase and vice versa. In addition, the redundancy condition for nodes may differ from that for layers. Furthermore, the loss-based redundancy condition for nodes from the same layer may be different from that for nodes from different layers.

In some embodiments, to improve the efficiency of the model compression pipeline 110, a removal candidate that is not may be removed from further consideration and may be deleted from a corresponding similarity matrix so that it is no longer considered in subsequent processing. This is performed by the candidate removal unit 560. For instance, if node 2 in FIG. 4 is a removal candidate but its simulated removal causes an increased loss, both the row and the column corresponding to node 2 may be deleted from the similarity matrix so that node 2 will no longer be assessed for removal in subsequent processing.

Figure 5B:
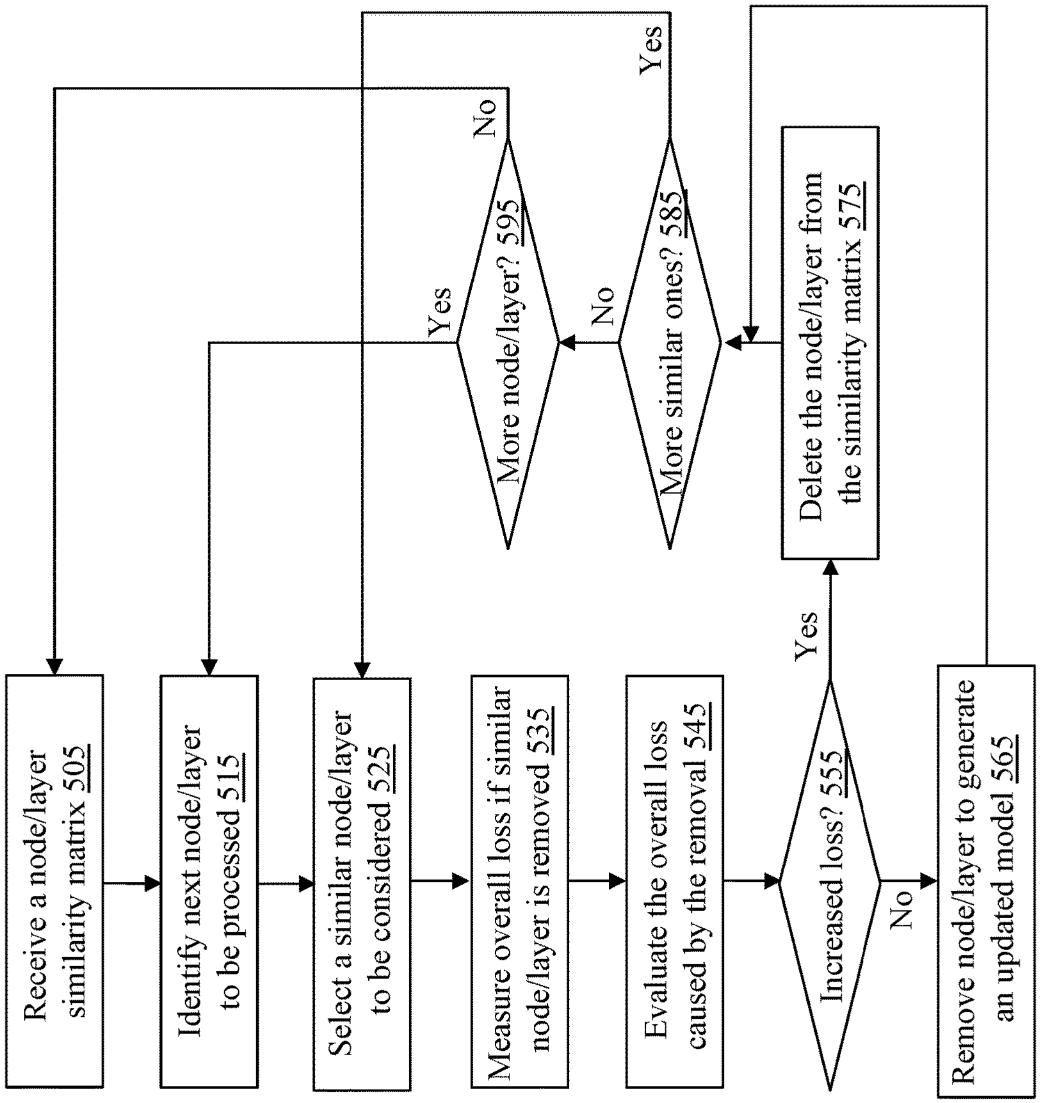
FIG. 5B is a flowchart of an exemplary process of a loss-based removal candidate determiner, in accordance with an embodiment of the present teaching.

FIG. 5B is a flowchart of an exemplary process of the loss-based removal candidate determiner 330, in accordance with an embodiment of the present teaching. As discussed herein with reference to FIGS. 3A-3B, the loss-based removal candidate determiner 330 is invoked in two situations. One is when the node level vector comparator 310 generates a node level similarity matrix based on aggregated output vectors of nodes in the original model 100. In this case, the loss-based removal candidate determiner 330 takes the node level similarity matrix and operates to determine which nodes in the model are redundant so that they can be removed from the original model 100. Another situation is when the layer level vector comparator 320 generates a layer level similarity matrix based on aggregated output vectors of layers of the original model 100. In this case, the loss-based removal candidate determiner 330 is to determine which layers are redundant and can be compressed. Whether it is node level assessment or layer level assessment, the operation of the loss-based removal candidate determiner 330 is substantially the same except the simulated removal (one is to simulate to remove a node and the other is to simulate to remove a layer).

In operation, when the loss-based removal candidate determiner 330 receives, at 505, a similarity matrix, it may identify, at 515, a next row (corresponding to a node or a layer) in the matrix to process. With respect to the selected row, the removal candidate selector 510 selects, at 525, a next node/layer in the row that performs a similar function, i.e., the similarity measure exceeds a pre-determined level. The selected removal candidate is then sent to the network loss determiner 520 to simulate the removal of the candidate from the model and then measures, at 535, the overall loss of the model in accordance with defined loss function (specified in 530). The measured overall loss after the simulated removal of the candidate is forwarded to the loss assessment unit 540, where it is evaluated, at 545, whether the simulated removal has a specified negative impact on the overall performance of the model. If the candidate is redundant (there is no loss increase or the loss increase is below the specified redundancy condition), determined at 555, the loss assessment unit 540 sends, at 565, information about the candidate to be removed to the compressed model configurator 340. If the candidate is not redundant, the candidate may be optionally deleted from the input similarity matrix at 575.

The above disclosed removal candidate determination process repeats for each of the candidates selected from each row of the matrix as performing a similar function until all rows are processed. Specifically, when there is more to consider with respect to a row, determined at 585, the processing goes back to step 525 to select the next candidate performing a similar function from the same row and then simulate the removal in order to determine whether the next candidate is redundant based on loss-based evaluation. When all candidates from the same row are processed, it is determined, at 595, whether there are more rows to be processed in the input similarity matrix. If so, the processing returns to step 515 to process the next row. If all rows have been processed, the loss-based removal candidate determiner 330 returns to step 505 to wait to receive another similarity matrix.

As shown in FIG. 3A, information about redundant nodes/layers is sent to the compressed model configurator 340, which may then proceed to remove the redundancy by, e.g., reconfiguring the model by skipping the redundant nodes/layers to compress the original model and produce the compressed model 120 with fewer nodes/layers. With respect to the particular application, the compressed model 120 is lighter weight as compared with the original model 100 and leverages the knowledge captured by the original model 100, whether explicitly or implicitly, to produce a fully functional compressed model 120 appropriate for the problem in hand yet requiring reduced computational resources without unnecessary waste.

Figure 6:
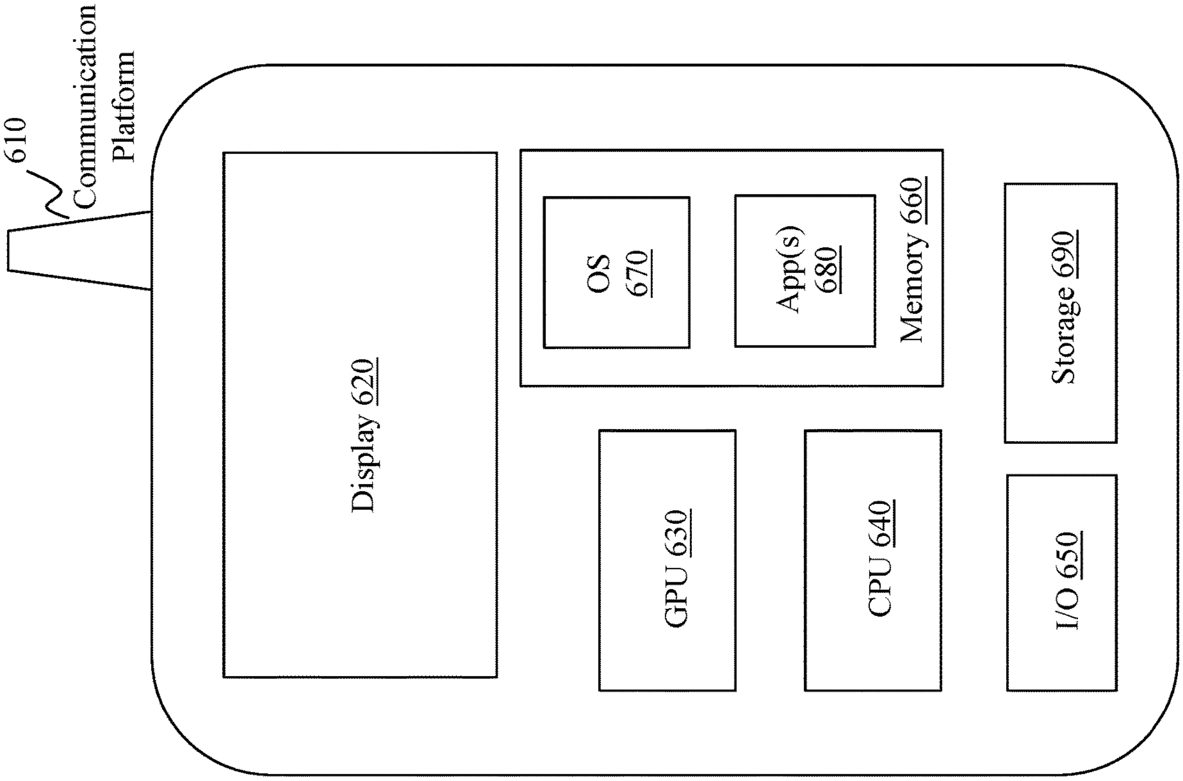
FIG. 6 is an illustrative diagram of an exemplary mobile device architecture that may be used to realize a specialized system implementing the present teaching in accordance with various embodiments.

FIG. 6 is an illustrative diagram of an exemplary mobile device architecture that may be used to realize a specialized system implementing the present teaching in accordance with various embodiments. In this example, the user device on which the present teaching may be implemented corresponds to a mobile device 600, including, but not limited to, a smart phone, a tablet, a music player, a handled gaming console, a global positioning system (GPS) receiver, and a wearable computing device, or a mobile computational unit in any other form factor. Mobile device 600 may include one or more central processing units ("CPUs") 640, one or more graphic processing units ("GPUs") 630, a display 620, a memory 660, a communication platform 610, such as a wireless communication module, storage 690, and one or more input/output (I/O) devices 650. Any other suitable component, including but not limited to a system bus or a controller (not shown), may also be included in the mobile device 600. As shown in FIG. 6, a mobile operating system 670 (e.g., iOS, Android, Windows Phone, etc.) and one or more applications 680 may be loaded into memory 660 from storage 690 in order to be executed by the CPU 640. The applications 680 may include a user interface or any other suitable mobile apps for information exchange, analytics, and management according to the present teaching on, at least partially, the mobile device 600. User interactions, if any, may be achieved via the I/O devices 650 and provided to the various components thereto.

To implement various modules, units, and their functionalities as described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar with to adapt those technologies to appropriate settings as described herein. A computer with user interface elements may be used to implement a personal computer (PC) or other type of workstation or terminal device, although a computer may also act as a server if appropriately programmed. It is believed that those skilled in the art are familiar with the structure, programming, and general operation of such computer equipment and as a result the drawings should be self-explanatory.

Figure 7:
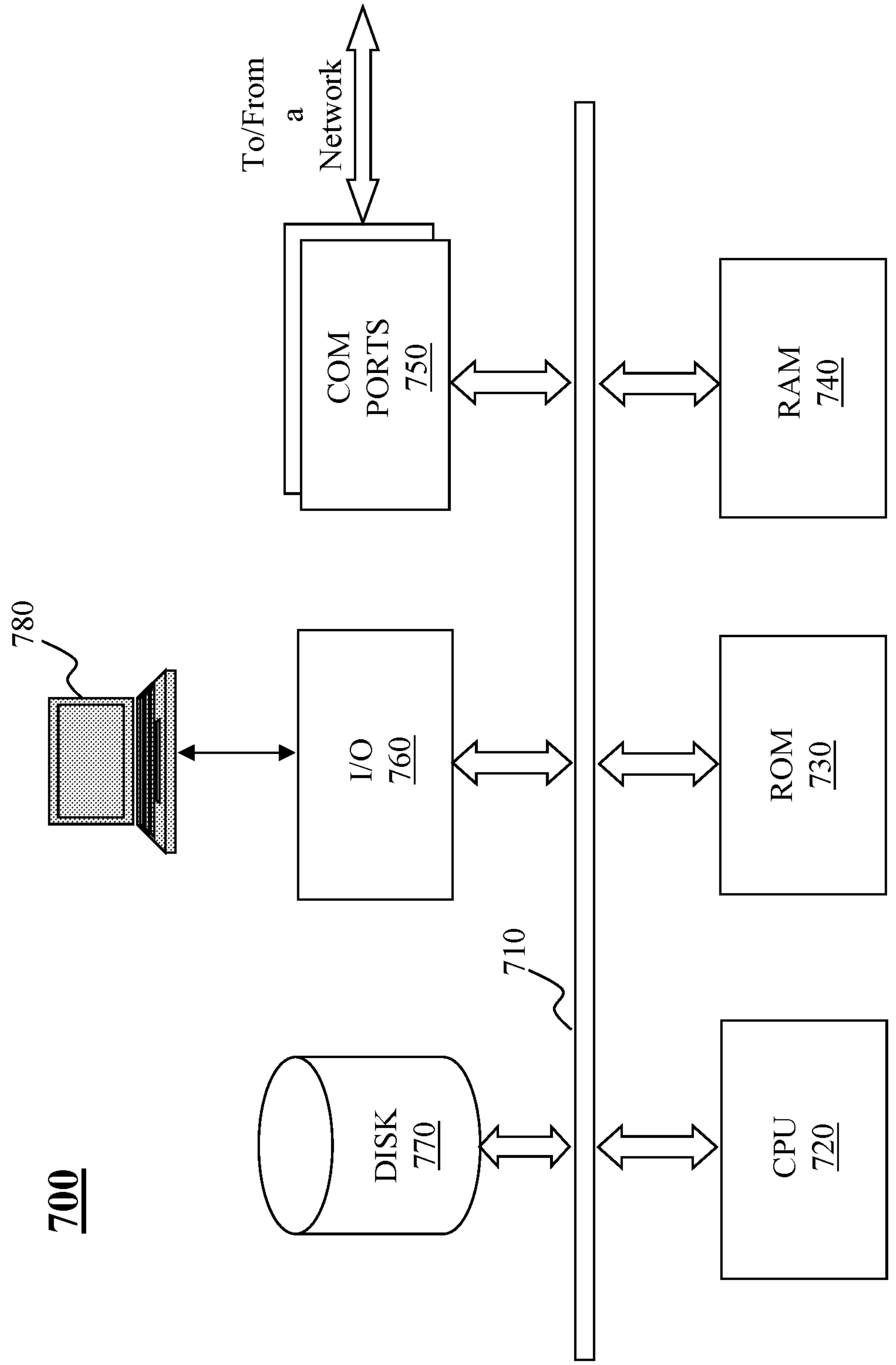
FIG. 7 is an illustrative diagram of an exemplary computing device architecture that may be used to realize a specialized system implementing the present teaching in accordance with various embodiments.

FIG. 7 is an illustrative diagram of an exemplary computing device architecture that may be used to realize a specialized system implementing the present teaching in accordance with various embodiments. Such a specialized system incorporating the present teaching has a functional block diagram illustration of a hardware platform, which includes user interface elements. The computer may be a general-purpose computer or a special purpose computer. Both can be used to implement a specialized system for the present teaching. This computer 700 may be used to implement any component or aspect of the framework as disclosed herein. For example, the information processing and analytical method and system as disclosed herein may be implemented on a computer such as computer 700, via its hardware, software program, firmware, or a combination thereof. Although only one such computer is shown, for convenience, the computer functions relating to the present teaching as described herein may be implemented in a distributed fashion on a number of similar platforms, to distribute the processing load.

Computer 700, for example, includes COM ports 750 connected to and from a network connected thereto to facilitate data communications. Computer 700 also includes a central processing unit (CPU) 720, in the form of one or more processors, for executing program instructions. The exemplary computer platform includes an internal communication bus 710, program storage and data storage of different forms (e.g., disk 770, read only memory (ROM) 730, or random-access memory (RAM) 740), for various data files to be processed and/or communicated by computer 700, as well as possibly program instructions to be executed by CPU 720. Computer 700 also includes an I/O component 760, supporting input/output flows between the computer and other components therein such as user interface elements 780. Computer 700 may also receive programming and data via network communications.

Hence, aspects of the methods of information analytics and management and/or other processes, as outlined above, may be embodied in programming. Program aspects of the technology may be thought of as “products” or “articles of manufacture” typically in the form of executable code and/or associated data that is carried on or embodied in a type of machine readable medium. Tangible non-transitory “storage” type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, in connection with information analytics and management. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to tangible “storage” media, terms such as computer or machine “readable medium” refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

It is noted that the present teachings are amenable to a variety of modifications and/or enhancements. For example, although the implementation of various components described above may be embodied in a hardware device, it may also be implemented as a software only solution, e.g., an installation on an existing server. In addition, the techniques as disclosed herein may be implemented as a firmware, firmware/software combination, firmware/hardware combination, or a hardware/firmware/software combination.

In the preceding specification, various example embodiments have been described with reference to the accompanying drawings. It will, however, be evident that various modifications and changes may be made thereto, and additional embodiments may be implemented, without departing from the broader scope of the present teaching as set forth in the claims that follow. The specification and drawings are accordingly to be regarded in an illustrative rather than restrictive sense.

We claim:

1. A method, comprising:

receiving an application-dependent dataset representative of an application to which an original machine learning model can be applied;

providing, to the original model, each of data samples in the application-dependent dataset so that each node/layer in the original model produces an output vector in response to the data sample;

obtaining, with respect to each of a plurality of nodes of each of multiple layers in the original machine learning model, an aggregated output vector based on the output vectors produced by the each node/layer in response to the data samples, respectively;

computing similarity metrics that measure the similarity of aggregated output vectors of a pair of nodes or a pair of layers in the original machine learning model;

selecting, based on the similarity metrics, removal candidate nodes and removal candidate layers that are functionally non-contributing to solving problems associated with the application;

evaluating, based on an impact of removal on an overall performance of the original machine learning model, each of the removal candidate nodes and each of the removal candidate layers to identify redundant nodes and layers in the original machine learning model;

removing redundant nodes and layers from the original model to generate a compressed model; and deploying the compressed model for the application.

2. The method of claim 1, wherein the original model is an artificial neural network (ANN) having the multiple layers including an input layer, one or more intermediate layers, and an output layer, wherein each of the multiple layers includes a plurality of nodes.

3. The method of claim 1, wherein the similarity metrics include:

node level similarity metrics each of which represents the similarity of two aggregated output vectors of a pair of nodes; and layer level similarity metrics each of which represents the similarity of two aggregated output vectors of a pair of layers, wherein removal candidate nodes are selected based on the node level similarity metrics, and removal candidate layers are selected based on the layer level similarity metrics.

4. The method of claim 3, wherein a similarity metric is computed via an inner product of two aggregated output vectors.

5. The method of claim 4, further comprising:

identifying a removal candidate node if the similarity metric of its aggregated output vector with that of another node satisfies a first pre-determined condition; and identifying a removal candidate layer if the similarity metric of its aggregated output vector with that of another layer satisfies a second pre-determined condition.

6. The method of claim 1, wherein the evaluating comprises:

selecting a removal candidate, which is either a removal candidate node or a removal candidate layer;

simulating a removal of the removal candidate from the original model;

computing, during the simulation, a first overall loss of the original model without the removal candidate based on a pre-determined loss function;

assessing whether the first overall loss and a second overall loss of the original with the removal candidate therein satisfy a pre-determined condition;

designating, if the pre-determined condition is satisfied, the removal candidate as redundant so that it is to be removed from the original model.

7. The method of claim 6, further comprising:

when the pre-determined condition is not satisfied, designating the removal candidate as non-redundant.

8. A machine readable and non-transitory medium, having information recorded thereon, wherein the information, once read by the machine, causes the machine to perform the following steps:

obtaining an original model from training via machine learning, wherein the original model includes multiple connected layers, each of which has a plurality of nodes;

receiving an application-dependent dataset representative of an application to which the original model can be applied;

providing, to the original model, each of data samples in the application-dependent dataset so that each node/layer in the original model produces an output vector in response to the data sample;

obtaining, with respect to each of the plurality of nodes of each of the multiple layers, an aggregated output vector based on the output vectors produced by the node/layer in response to the data samples, respectively;

computing similarity metrics each of which measures the similarity of aggregated output vectors of a pair of nodes or a pair of layers;

selecting, based on the similarity metrics, removal candidate nodes and removal candidate layers that are functionally non-contributing to solving problems associated with the application;

evaluating, based on an impact of removal on an overall performance of the original machine learning model, each of the removal candidate nodes and each of the removal candidate layers to identify redundant nodes and layers in the original model;

removing redundant nodes and layers from the original model to generate a compressed model; and deploying the compressed model for the application.

9. The medium of claim 8, wherein the original model is an artificial neural network (ANN) having the multiple layers including an input layer, one or more intermediate layers, and an output layer, wherein each of the multiple layers includes a plurality of nodes.

10. The medium of claim 8, wherein the similarity metrics include:

node level similarity metrics each of which represents the similarity of two aggregated output vectors of a pair of nodes; and layer level similarity metrics each of which represents the similarity of two aggregated output vectors of a pair of layers, wherein removal candidate nodes are selected based on the node level similarity metrics, and removal candidate layers are selected based on the layer level similarity metrics.

11. The medium of claim 10, wherein a similarity metric is computed via an inner product of two aggregated output vectors.

12. The medium of claim 11, wherein a removal candidate node is identified if the similarity metric of its aggregated output vector with that of another node satisfies a first pre-determined condition; and a removal candidate layer is identified if the similarity metric of its aggregated output vector with that of another layer satisfies a second pre-determined condition.

13. The medium of claim 8, wherein the evaluating comprises:

selecting a removal candidate, which is either a removal candidate node or a removal candidate layer;

simulating a removal of the removal candidate from the original model;

computing, during the simulation, a first overall loss of the original model without the removal candidate based on a pre-determined loss function;

assessing whether the first overall loss and a second overall loss of the original with the removal candidate therein satisfy a pre-determined condition;

designating, if the pre-determined condition is satisfied, the removal candidate as redundant so that it is to be removed from the original model.

14. The medium of claim 13, wherein, the information, when read by the medium, further causes the machine to perform the following steps:

when the pre-determined condition is not satisfied, designating the removal candidate as non-redundant.

15. A system, comprising:

an original model obtained from training via machine learning, wherein the original model includes multiple connected layers, each of which has a plurality of nodes, wherein the original model is configured for:

receiving each of data samples in an application-dependent dataset representative of an application which the original model can be applied, and producing, at each node/layer of the original model, an output vector in response to each of the data samples;

a model compression pipeline implemented by a processor and configured for:

obtaining, with respect to each of the plurality of nodes of each of the multiple layers, an aggregated output vector based on the output vectors produced by the node/layer in response to the data samples, respectively, computing similarity metrics each of which measures the similarity of aggregated output vectors of a pair of nodes or a pair of layers, selecting, based on the similarity metrics, removal candidate nodes and removal candidate layers that are functionally non-contributing to solving problems associated with the application, evaluating, based on an impact of removal on an overall performance of the original machine learning model, each of the removal candidate nodes and each of the removal candidate layers to identify redundant nodes and layers in the original model, and removing redundant nodes and layers from the original model to generate a compressed model.

16. The system of claim 15, wherein the similarity metrics include:

node level similarity metrics each of which represents the similarity of two aggregated output vectors of a pair of nodes; and layer level similarity metrics each of which represents the similarity of two aggregated output vectors of a pair of layers, wherein removal candidate nodes are selected based on the node level similarity metrics, and removal candidate layers are selected based on the layer level similarity metrics.

17. The system of claim 16, wherein a similarity metric is computed via an inner product of two aggregated output vectors.

18. The system of claim 17, wherein a removal candidate node is identified if the similarity metric of its aggregated output vector with that of another node satisfies a first pre-determined condition; and a removal candidate layer is identified if the similarity metric of its aggregated output vector with that of another layer satisfies a second pre-determined condition.

19. The system of claim 15, wherein the evaluating comprises:

selecting a removal candidate, which is either a removal candidate node or a removal candidate layer;

simulating a removal of the removal candidate from the original model;

computing, during the simulation, a first overall loss of the original model without the removal candidate based on a pre-determined loss function;

assessing whether the first overall loss and a second overall loss of the original with the removal candidate therein satisfy a pre-determined condition;

designating, if the pre-determined condition is satisfied, the removal candidate as redundant so that it is to be removed from the original model.

20. The system of claim 19, wherein the model compression pipeline is further configured for:

when the pre-determined condition is not satisfied, designating the removal candidate as non-redundant.

* * * * *